United States Patent
Wu et al.

(10) Patent No.: US 11,632,686 B2
(45) Date of Patent: Apr. 18, 2023

(54) COLLISION HANDLING FOR CSI REPORTING ON PUSCH

(71) Applicant: QUALCOMM Incorporated, San Diego, CA (US)

(72) Inventors: Liangming Wu, Beijing (CN); Yu Zhang, Beijing (CN); Yi Huang, San Diego, CA (US); Chenxi Hao, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/044,207

(22) PCT Filed: Apr. 2, 2019

(86) PCT No.: PCT/CN2019/080961
§ 371 (c)(1),
(2) Date: Sep. 30, 2020

(87) PCT Pub. No.: WO2019/192459
PCT Pub. Date: Oct. 10, 2019

(65) Prior Publication Data
US 2021/0051509 A1    Feb. 18, 2021

(30) Foreign Application Priority Data

Apr. 5, 2018    (WO) ................ PCT/CN2018/082064

(51) Int. Cl.
*H04W 24/10*    (2009.01)
*H04B 7/06*    (2006.01)
(Continued)

(52) U.S. Cl.
CPC .......... *H04W 24/10* (2013.01); *H04B 7/0626* (2013.01); *H04L 1/1812* (2013.01);
(Continued)

(58) Field of Classification Search
CPC ...................................................... H04L 12/50
(Continued)

(56) References Cited

U.S. PATENT DOCUMENTS

2011/0249578 A1    10/2011    Nayeb Nazar et al.
2013/0114455 A1    5/2013    Yoo et al.
(Continued)

FOREIGN PATENT DOCUMENTS

CN    101630981 A    1/2010
CN    101800620 A    8/2010
(Continued)

OTHER PUBLICATIONS

International Search Report and Written Opinion—PCT/CN2018/082064—ISA/EPO—dated Dec. 29, 2018.
(Continued)

*Primary Examiner* — Dang T Ton
(74) *Attorney, Agent, or Firm* — Qualcomm Incorporated

(57) ABSTRACT

Certain aspects of the present disclosure provide techniques for collision handling for channel state information (CSI) reporting on a physical uplink shared channel (PUSCH). A method for wireless communications by a user equipment (UE) is provided. The method generally includes receiving scheduling for at least one CSI reporting transmission and at least one uplink transmission in a same slot. The UE determines to multiplex the at least one CSI and the at least one uplink transmission in the slot or to drop the at least one CSI or the at least one uplink transmission in the slot. The
(Continued)

UE transmits in the slot at least one of: the at least one CSI transmission or the at least one uplink transmission based on the determination.

31 Claims, 13 Drawing Sheets

(51) Int. Cl.
*H04L 1/1812* (2023.01)
*H04L 1/1829* (2023.01)
*H04L 1/1867* (2023.01)
*H04W 72/0446* (2023.01)
*H04W 72/0453* (2023.01)
*H04W 72/12* (2023.01)

(52) U.S. Cl.
CPC .......... *H04L 1/1854* (2013.01); *H04L 1/1887* (2013.01); *H04W 72/0446* (2013.01); *H04W 72/0453* (2013.01); *H04W 72/1278* (2013.01)

(58) Field of Classification Search
USPC ......................................................... 370/329
See application file for complete search history.

(56) References Cited

U.S. PATENT DOCUMENTS

| 2017/0041923 | A1 | 2/2017 | Park |
| 2017/0135090 | A1 | 5/2017 | Yin et al. |
| 2022/0029686 | A1* | 1/2022 | Hao .................. H04B 7/0663 |

FOREIGN PATENT DOCUMENTS

| CN | 103004116 A | 3/2013 |
| CN | 104429015 A | 3/2015 |
| CN | 107431605 A | 12/2017 |
| EP | 2385647 A2 | 11/2011 |
| EP | 2850763 A1 | 3/2015 |
| EP | 2880802 A1 | 6/2015 |
| TW | 201806409 A | 2/2018 |
| WO | 2009100217 A2 | 8/2009 |

OTHER PUBLICATIONS

International Search Report and Written Opinion—PCT/CN2019/080961—ISA/EPO—dated Jul. 8, 2019.
Supplementary European Search Report—EP19781634—Search Authority—Munich—dated Nov. 23, 2021.

* cited by examiner

COLLISION HANDLING FOR CSI REPORTING ON PUSCH

CROSS-REFERENCE TO RELATED APPLICATION & PRIORITY CLAIM

This application is a national stage application under 35 U.S.C. 371 of PCT/CN2019/080961, filed Apr. 2, 2019, which claims benefit of and priority to Patent Cooperation Treaty Application Serial No. PCT/CN2018/082064, filed Apr. 5, 2018, both herein incorporated by reference in their entireties as if fully set forth below and for all applicable purposes.

BACKGROUND

Field of the Disclosure

Aspects of the present disclosure relate to wireless communications, and more particularly, to techniques for collision handling for channel state information (CSI) reporting on the physical uplink shared channel (PUSCH).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure relate to collision handling for channel state information (CSI) reporting on the physical uplink shared channel (PUSCH).

Certain aspects provide a method for wireless communication by a user equipment (UE). The method generally includes receiving scheduling for at least one CSI reporting transmission and at least one uplink transmission in a same slot. The method includes multiplex the at least one CS reporting transmission and the at least one uplink transmission in the slot or to drop the at least one CSI reporting transmission or the at least one uplink transmission in the slot. The method includes transmitting in the slot at least one of: the at least one CSI reporting transmission or the at least one uplink transmission based on the determination.

Certain aspects provide a method for wireless communication by a base station (BS). The method generally includes scheduling a UE to transmit scheduling requests (SRs) in a first set of slots and to transmit CSI in a second set of slots that is non-overlapping with the first set of slots. The method includes receiving SRs in the first set of slots and CSI in the second set of slots.

Certain aspects provide an apparatus for wireless communication. The apparatus generally includes means for receiving scheduling for at least one CSI reporting transmission and at least one uplink transmission in a same slot. The apparatus includes means for multiplex the at least one CSI reporting transmission and the at least one uplink transmission in the slot or to drop the at least one CSI reporting transmission or the at least one uplink transmission in the slot. The apparatus includes means for transmitting in the slot at least one of: the at least one CSI reporting transmission or the at least one uplink transmission based on the determination.

Certain aspects provide an apparatus for wireless communication. The apparatus generally includes means for scheduling a UE to transmit SRs in a first set of slots and to transmit CSI in a second set of slots that is non-overlapping with the first set of slots. The apparatus includes means for receiving SRs in the first set of slots and CSI in the second set of slots.

Certain aspects provide an apparatus for wireless communication. The apparatus generally includes a receiver configured to receive scheduling for at least one CSI reporting transmission and at least one uplink transmission in a same slot. The apparatus includes at least one processor coupled with am memory and configured to determine to multiplex the at least one CSI reporting transmission and the at least one uplink transmission in the slot or to drop the at least one CSI reporting transmission or the at least one uplink transmission in the slot. The apparatus includes a transmitter configured to transmit in the slot at least one of: the at least one CSI reporting transmission or the at least one uplink transmission based on the determination.

Certain aspects provide an apparatus for wireless communication. The apparatus generally includes at least one processor coupled with a memory and configured to schedule a UE to transmit SRs in a first set of slots and to transmit CSI in a second set of slots that is non-overlapping with the first set of slots. The apparatus includes a receiver configured to receive SRs in the first set of slots and CSI in the second set of slots.

Certain aspects provide a computer readable medium having computer executable code stored thereon for wireless communication. The computer readable medium generally includes code for receiving scheduling for at least one CSI reporting transmission and at least one uplink transmission in a same slot. The computer readable medium includes code for multiplex the at least one CSI reporting transmission and the at least one uplink transmission in the slot or to drop the at least one CSI reporting transmission or the at least one uplink transmission in the slot. The computer readable medium includes code for transmitting in the slot at least one of: the at least one CSI reporting transmission or the at least one uplink transmission based on the determination.

Certain aspects provide a computer readable medium having computer executable code stored thereon for wireless communication. The computer readable medium generally includes code for scheduling a UE to transmit SRs in a first set of slots and to transmit CSI in a second set of slots that is non-overlapping with the first set of slots. The computer readable medium includes code for receiving SRs in the first set of slots and CSI in the second set of slots.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
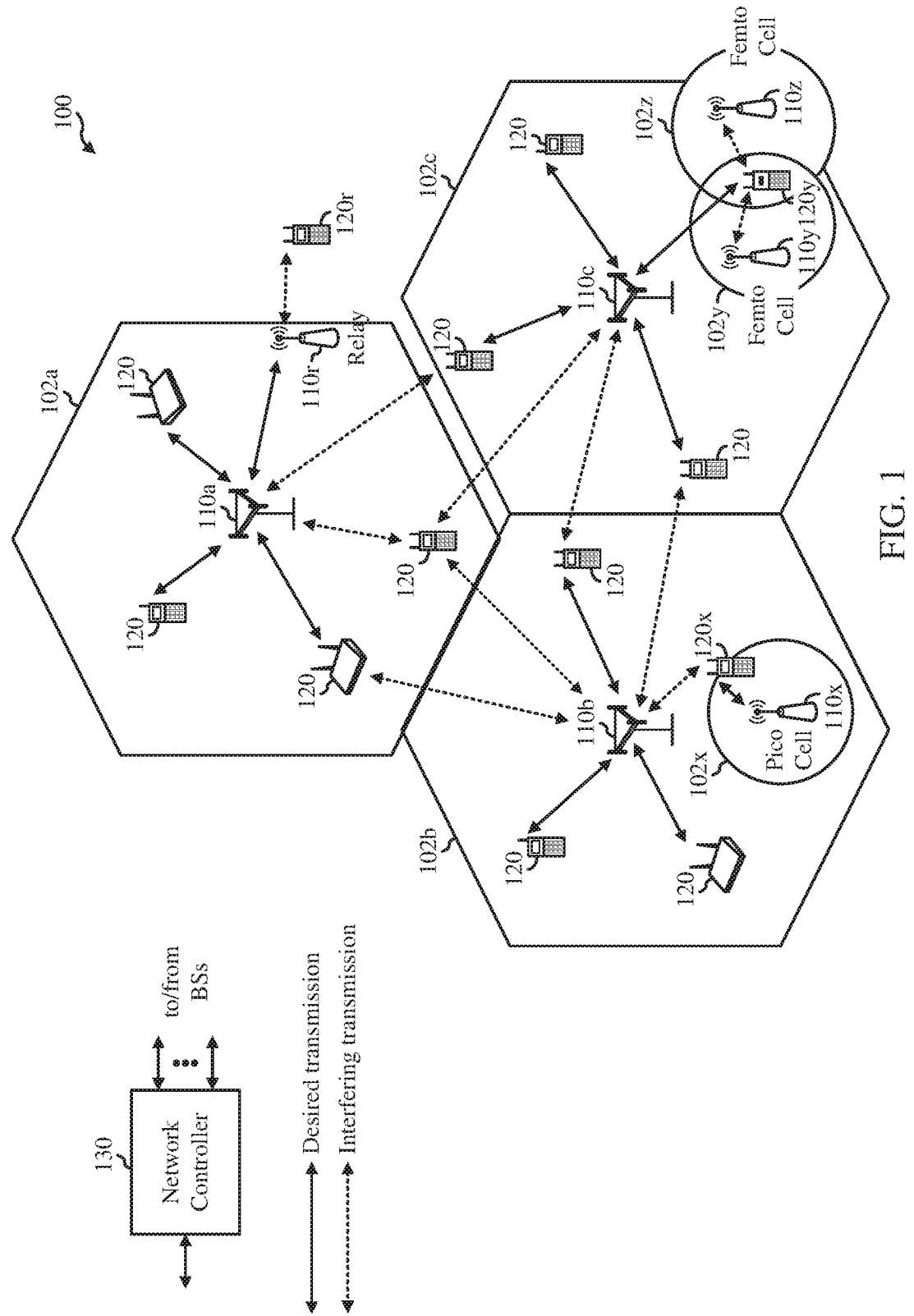
FIG. 1 is a block diagram conceptually illustrating an example telecommunications system, in accordance with certain aspects of the present disclosure.

Aspects of the present disclosure provide apparatus, methods, processing systems, and computer readable mediums for collision handling for channel state information (CSI) reporting on the physical uplink shared channel (PUSCH).

In certain systems, user equipment (UE) are configured for semi-persistent (SP) CSI transmission on the PUSCH. The UEs can also transmit aperiodic CSI on the PUSCH. The UEs may also be scheduled for other uplink transmissions that can occur in the same slot (e.g., collide) as the SP-CSI and/or A-CSI transmissions in the slot. For example, the UE may have data to transmit in the PUSCH and/or scheduling requests (SRs), buffer status reports (BSRs), and/or hybrid automatic repeat request (HARQ) feedback to transmit in a physical uplink control channel (PUCCH) in the same slot. Thus, collision handling is needed for CSI and data in the same PUSCH. Further. UEs may not transmit PUSCH and PUCCH in the same slot and, therefore, collision handling is needed for CSI in the PUSCH and SR, BSR, and/or HARQ feedback in a PUCCH in the same slot.

Accordingly, aspects of the present disclosure provide collision handling for CSI on the PUSCH and other uplink transmissions scheduled in the same slot.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspect-.

The techniques described herein may be used for various wireless communication technologies, such as LTE, CDMA, TDMA, FDMA, OFDMA, SC-FDMA and other networks. The terms "network" and "system" are often used interhangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF), 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. A UE 120 is scheduled (e.g., signaled and/or configured) for a channel state information (CSI) transmission, such as semi-periodic (SP) CSI or aperiodic CSI (A-CSI), in a slot. The UE 120 is also scheduled (e.g., signaled and/or configured) for an uplink transmission (e.g., a scheduling request (SR), buffer status report (BSR), hybrid automatic repeat request (HARQ) feedback, and/or data) in the same slot. The UE 120 determines to multiplex or drop the CSI and another uplink transmission and transmits in the slot in accordance with the determination. In another example, a BS 110 schedules CSI and SR such that they do not collide.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
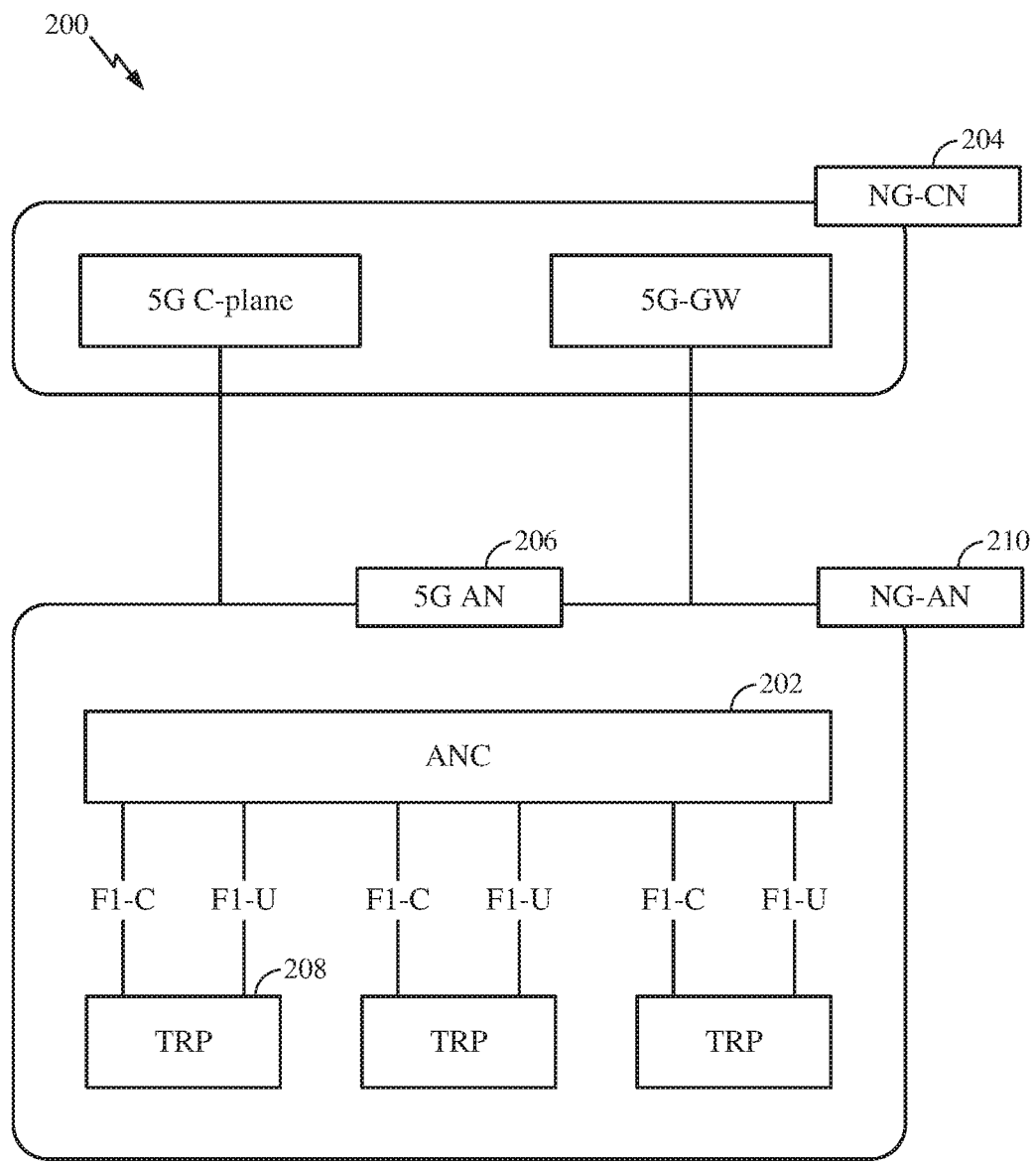
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells. BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
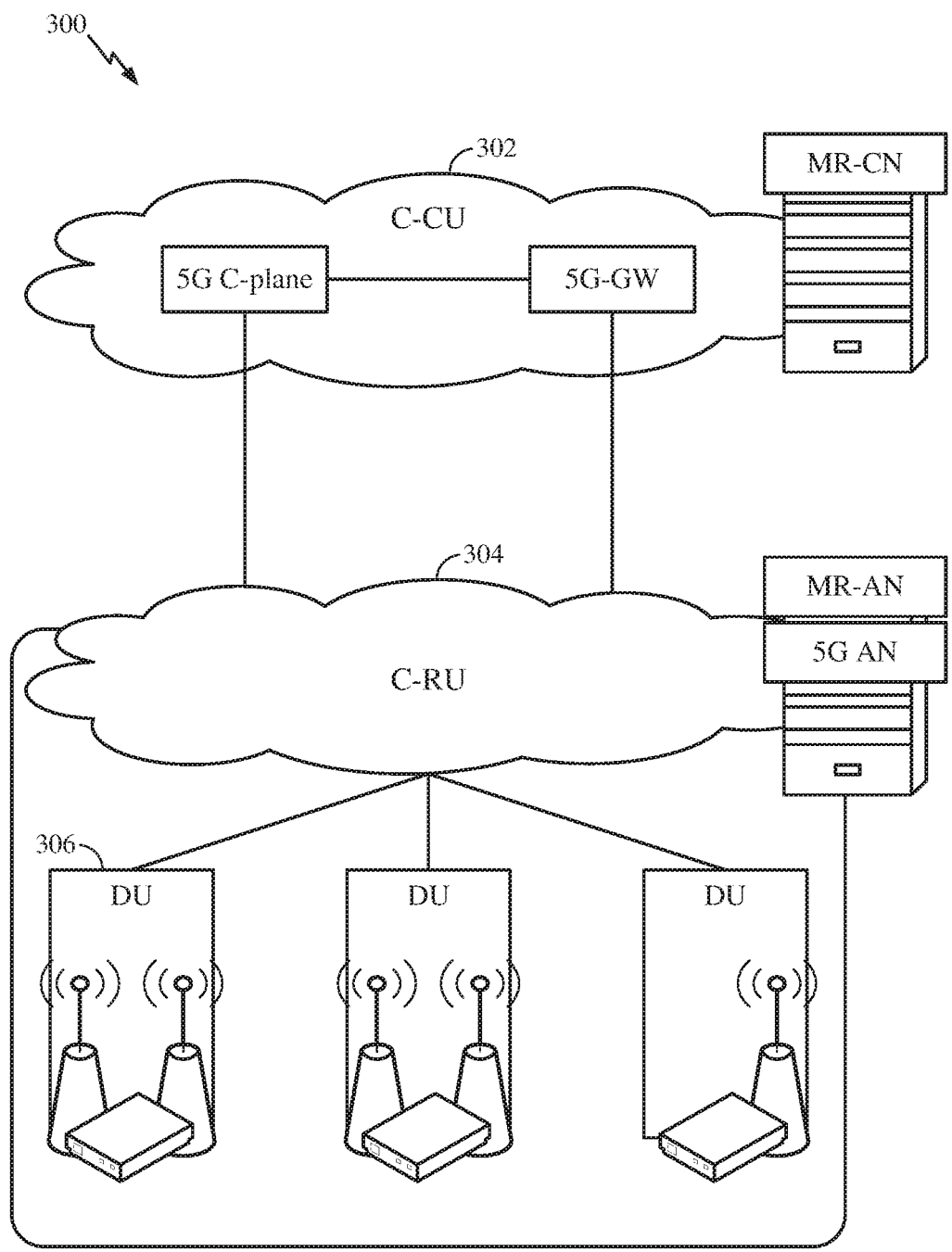
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
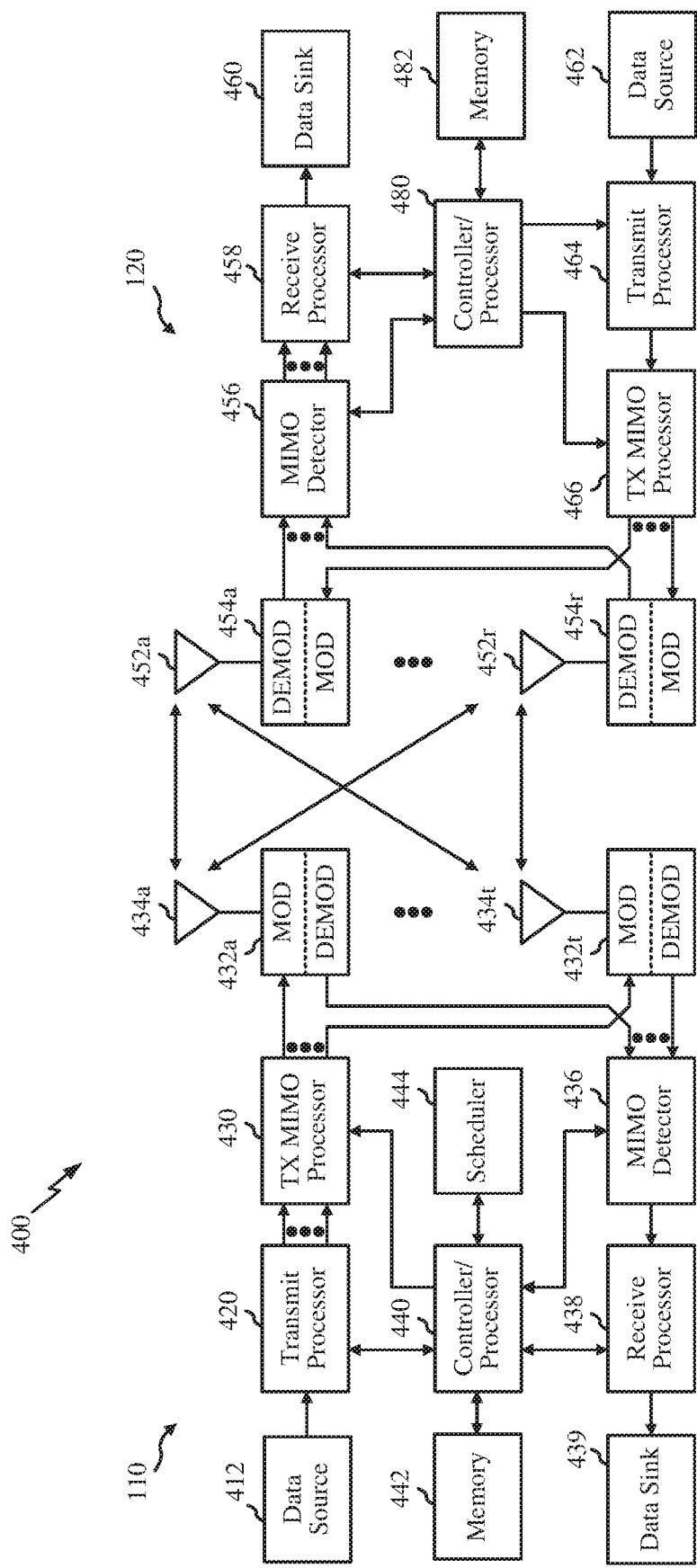
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for CSI collision handling for PUSCH.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
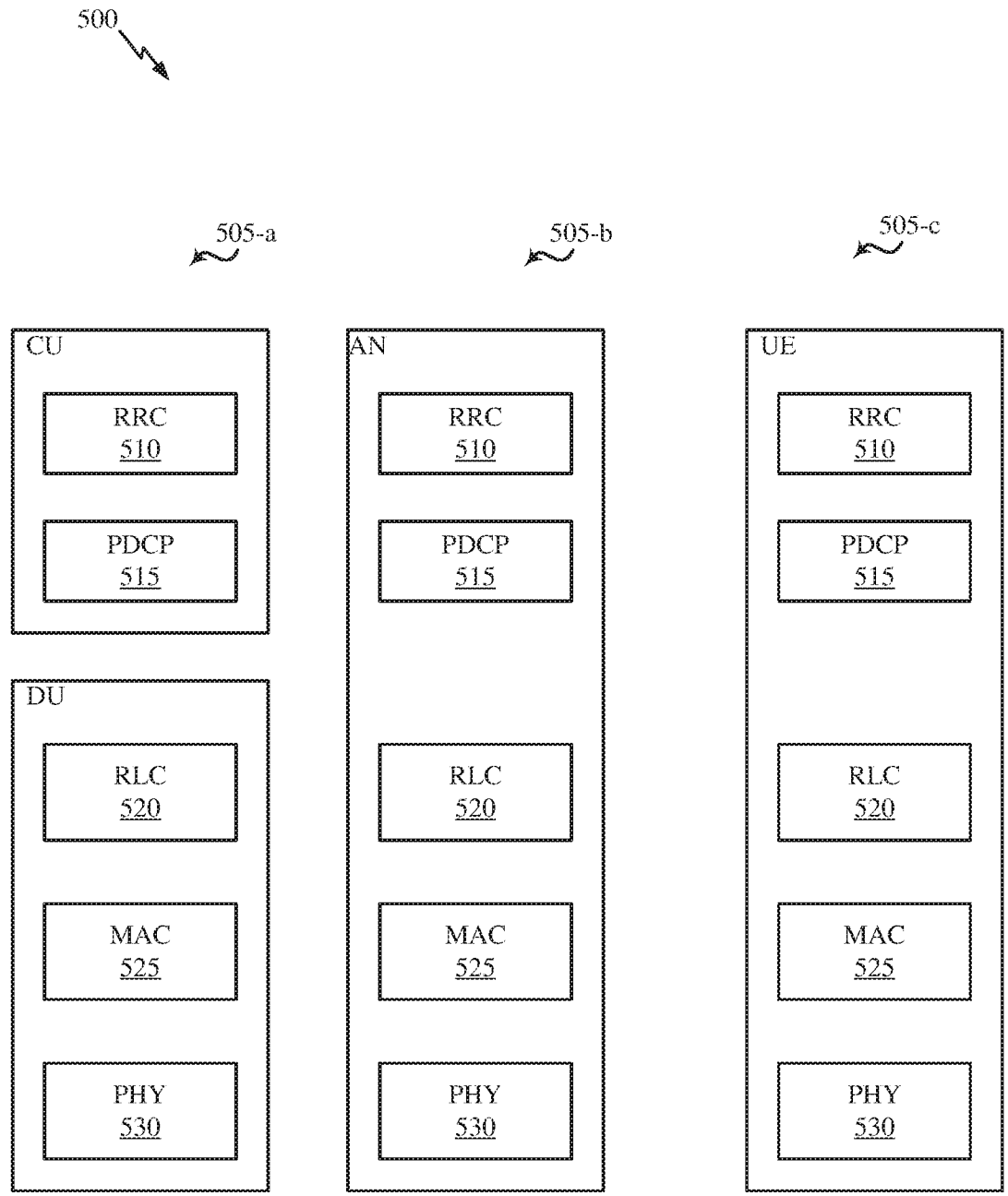
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
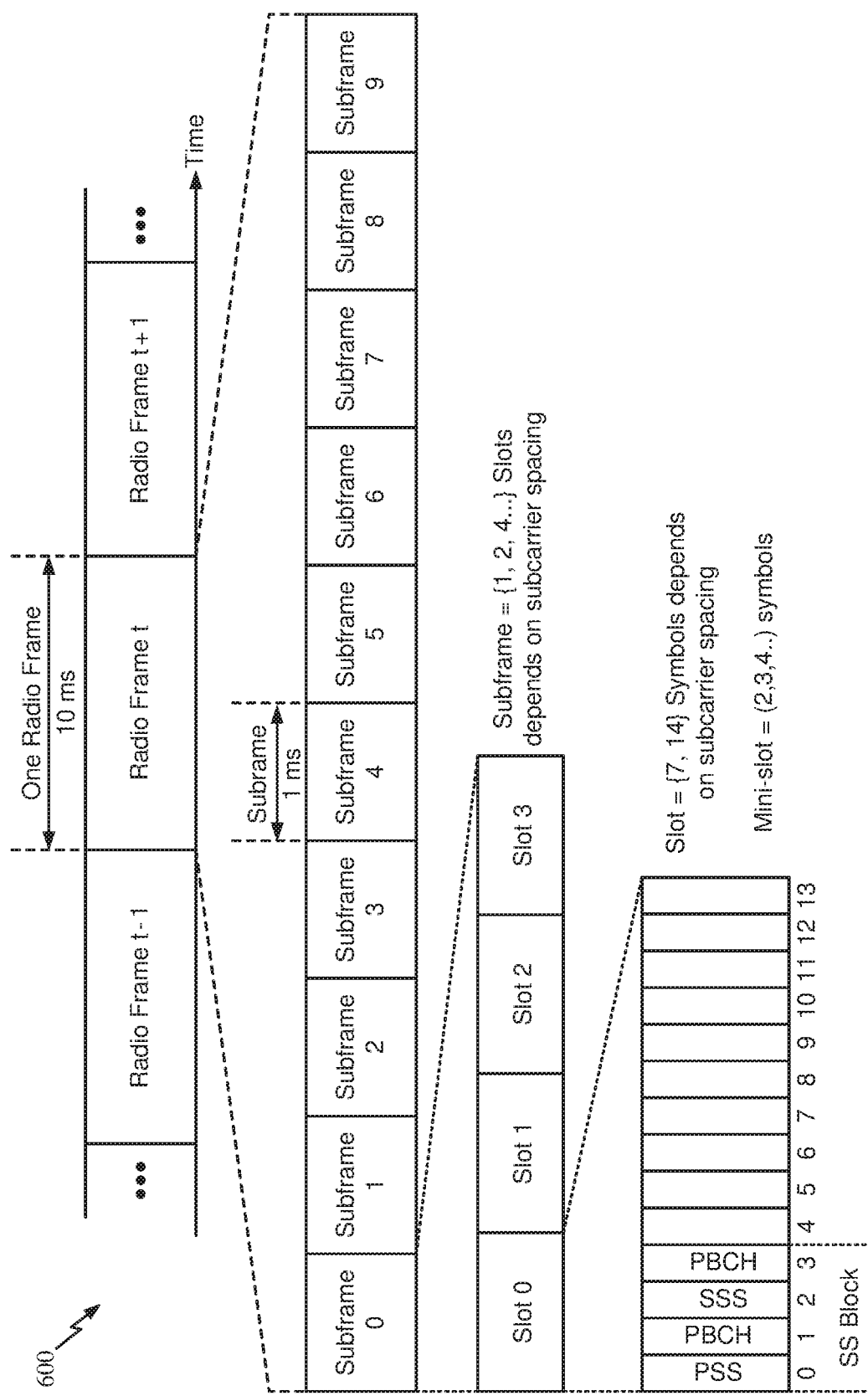
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DI/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Collision Handling for CSI Reporting on PUSCH

In certain systems, such as NR (new radio or 5G technology access) systems, semi-persistent channel state information (SP-CSI) is configured to be fed back on the physical uplink shared channel (PUSCH) by a user equipment (UE). A base station (BS) sends downlink control information (DCI) to the UE to trigger SP-CSI transmission, along with the PUSCH resource for the SP-CSI. Aperiodic CSI can also be transmitted (e.g., scheduled or configured) in the PUSCH. Scheduling request(s) (SRs), buffer status report(s) (BSRs), and/or hybrid automatic repeat request (HARQ) feedback (e.g., such as acknowledgements and/or negative acknowledgments) can be transmitted (e.g., scheduled or configured) in the physical uplink control channel (PUCCH). Thus, SP-CSI, A-CSI, uplink data, SR, BSR, and/or HARQ feedback can collide within the same transmission time interval (e.g., slot). PUSCH and PUCCH may not both be transmitted in the same TTI.

Accordingly, aspects of the present disclosure provide collision handling for CSI on the PUSCH and other uplink transmissions scheduled in the same slot. Aspects relate to whether CSI, data, other uplink control information (e.g., SR. HARQ ACK), PUSCH, and/or PUCCH are transmitted or dropped and, if not dropped, on which channel (e.g., PUSCH or PUCCH) the CSI and/or other UCI is transmitted.

Figure 7:
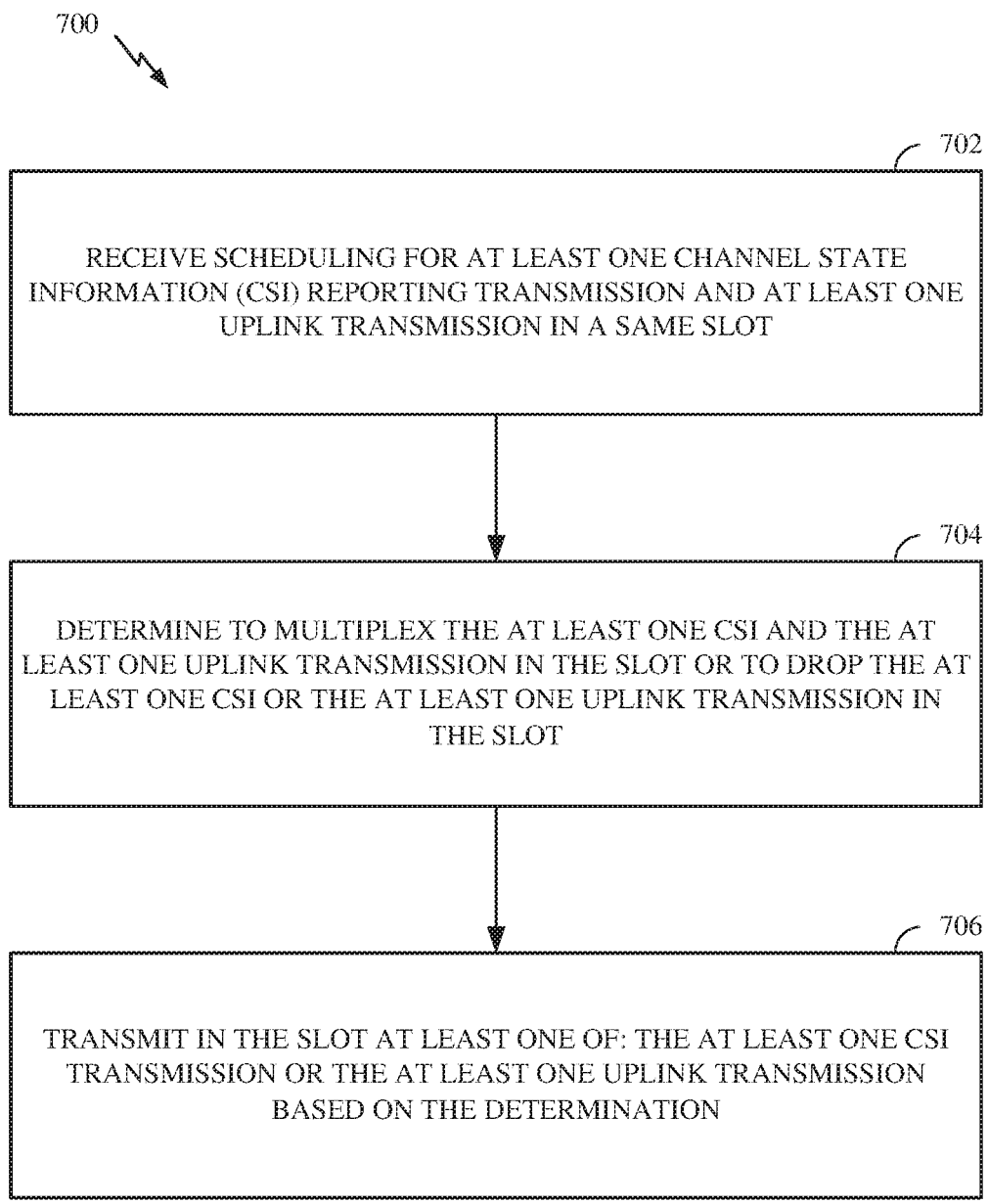
FIG. 7 is a flow diagram illustrating example operations for wireless communications by a UE, in accordance with certain aspects of the present disclosure.

FIG. 7 is a flow diagram illustrating example operations 700 for wireless communications, in accordance with certain aspects of the present disclosure. The operations 700 may be performed by a UE (e.g., such as a UE 120 in the wireless communication network 100) for collision handling of CSI in PUSCH. The operations 700 may be implemented as software components that are executed and run on one or more processors (e.g., processor 480 of FIG. 4). Further, the transmission and reception of signals by the UE in operations 700 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals. A BS (such as a BS 110 in the wireless communication network 100) may perform complimentary operations to the operations 700 performed by the UE.

The operations 700 may begin, at 702, by receiving scheduling (or configuring) for at least one CSI reporting transmission and at least one uplink transmission in a same slot. The at least one CSI reporting transmission may be a SP-CSI and/or an A-CSI. The CSI reporting transmission may be scheduled on a PUSCH in a slot (e.g., one or more symbols within the slot) or slots. The CSI reporting transmission may be triggered by a downlink control information (DCI) from a BS (e.g., such as a BS 110 in the wireless communication network 100). The at least one uplink transmission may be uplink data the UE is scheduled to transmit in the PUSCH and/or other UCI such as a SR, a BSR, and/or a HARQ feedback (e.g., such as an ACK/NACK) scheduled on the PUCCH in the same slot as the CSI.

At 704, the UE determines to multiplex (e.g., time- and/or frequency-domain multiplex) the at least one CSI reporting transmission and the at least one uplink transmission in the slot or to drop the at least one CSI reporting transmission or the at least one uplink transmission in the slot.

At 706, the UE transmits in the slot at least one of: the at least one CSI reporting transmission or the at least one uplink transmission based on the determination.

The CSI reporting transmission may collide with SR (or BSR). In some examples, the CSI transmission may be considered to collide with SR only when the SR is a positive SR. In some examples, the CS reporting transmission be considered to collide with SR whether the SR is positive or negative (e.g., not due for transmission). According to certain aspects, when making the determination at 704, the UE may disregard the SR for the determination if the SR is a negative SR. Alternatively, when making the determination at 704, the UE considers the SR as colliding regardless whether the SR is positive or negative.

According to certain aspects, the UE determines (e.g., at 704) to multiplex the at least one CSI reporting transmission and the SR, BSR, and/or HARQ feedback in the PUSCH. For example, the UE may multiplex the CSI and the HARQ feedback in the PUSCH and drop the PUCCH. An encoding rule may be used for the multiplexed transmission. For example, the UE may encode bits for the PUSCH according to a priority associated with the at least one CSI transmission, the SR, and the HARQ feedback. The transmitting at 706 may include transmitted the encoded bits. According to certain aspects, the HARQ-ACK may have a higher priority in bit allocation than SR, followed by A/SP-CSI. For example, CSI transmission (SP-CSI and/or A-CSI) is associated with a first priority. SR is associated with a second priority higher than the first priority, and HARQ feedback is associated with a third priority higher than the second priority. In some examples, the HARQ feedback and SR have a same priority and are jointly encoded and multiplexed with the at least one CSI transmission. In some examples, if the number of bits of the jointly encoded SR and HARQ feedback is equal to or less than 2 bits, then the jointly encoded SR and HARQ feedback punctures the CSI/PUSCH transmission. If the number of bits of the jointly encoded SR and HARQ feedback is greater than 2 bits, then the jointly encoded SR and HARQ feedback rate-matches the CSI/PUSCH. According to certain aspects, the UE encodes bits for the transmission according to a rule, such a rule used for uplink control information (UCI) on PUSCH.

According to certain aspects, the UE determines (e.g., at 704) to multiplex the at least one CSI reporting transmission and the SR, BSR, and/or HARQ transmission in the PUCCH. In some examples, the multiplexed CSI with SR, BSR, and/or HARQ is transmitted on the PUCCH resource allocated for the SR.

According to certain aspects, the UE determines (e.g., at 704) to drop the at least one CSI reporting transmission in the slot. In some examples, the CSI transmission is dropped and the SR (or BSR) and/or HARQ feedback are reported on the PUCCH. In some examples, the CSI reporting transmission is dropped and the SR and/or HARQ feedback are reported on the PUSCH.

According to certain aspects, the UE determines (e.g., at 704) to drop the SR (or BSR) transmission in the slot. In some examples, the CSI reporting transmission and, if present, the HARQ feedback are reported on the PUSCH.

According to certain aspects, the UE determines (e.g., at 704) to drop the CSI transmission or the SR (or BSR) transmission based on an associated priority of the transmissions. In some examples, the priority is pre-determined or pre-configured a BS. The priority may be configured by a higher layer configuration or may be semi-statically configured (e.g., via radio resource control (RRC) signaling). In some examples, SR is associated with a higher priority than CSI. In some examples, CSI is configured with a higher priority than SR. According to certain aspects, the UE is configured for multiple SR (or BSR). Each SR can be associated with its own quality-of-service (QoS) level. In some examples, the QoS level associated with the SRs is indicated implicitly by the index of the SR resource. In some examples, the QoS level associated with the SRs is explicitly indicated. In some examples, the priority associated with the SRs depends on the QoS level associated with the SR. For example, an SR associated with a high QoS level may have higher priority than the CSI and an SR associated with a lower QoS level may have a lower priority than the CSI.

According to certain aspects, the CSI reporting transmission, such SP-CSI, collides with uplink data in the PUSCH. The UE determines (e.g., at 704) to drop the CSI transmission or the uplink data in the slot.

Figure 8:
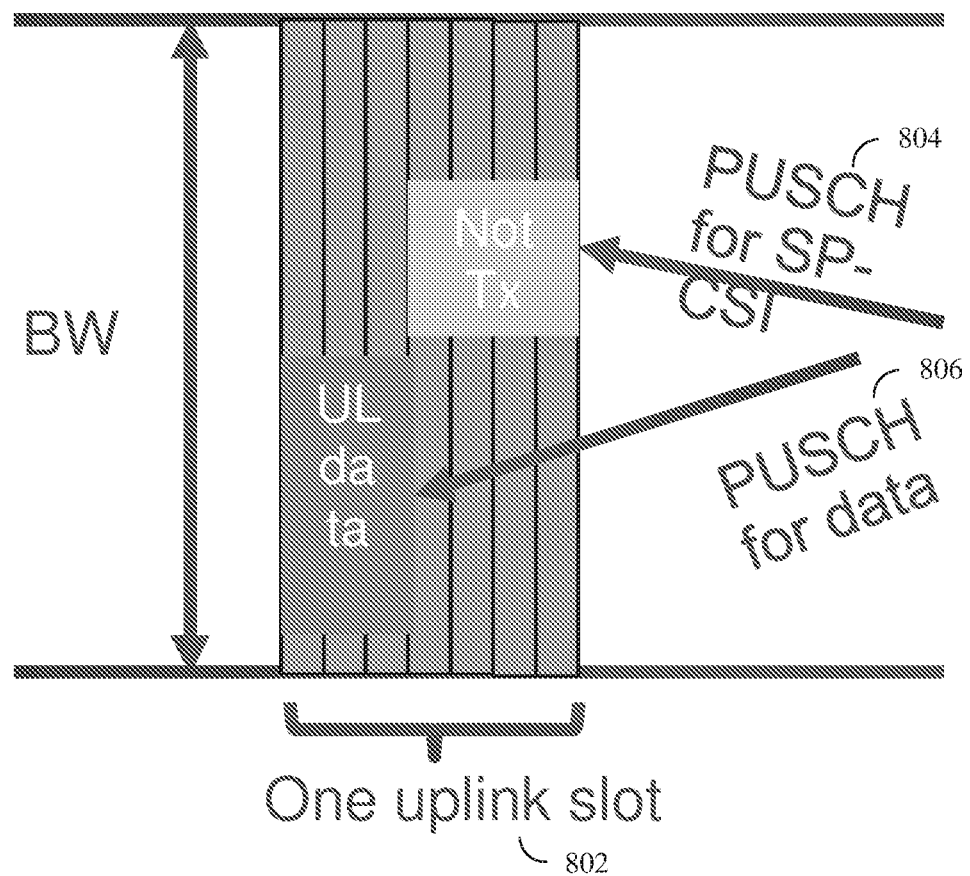
FIG. 8 is an example collision of semi-persistent channel state information (SP-CSI) and uplink data in a slot, in accordance with certain aspects of the present disclosure.

FIG. 8 is an example collision of SP-CSI and uplink data in a slot, in accordance with certain aspects of the present disclosure. According to certain aspects, the UE determines to drop the SP-CSI 804 if the uplink data 806 and SP-CSI 804 are scheduled in the same uplink slot 802 and the uplink data 806 is transmitted (e.g., the UE has uplink data to transmit). For example, the UE determines (e.g., at 704) to drop the at least one CSI transmission if the CSI reporting transmission is scheduled to be transmitted in the same slot as data and the UE has data to send and to transmit the at least one CSI reporting transmission if the CSI reporting transmission is scheduled to be transmitted in the same slot as data and the UE does not have data to send in the slot.

Figure 9:
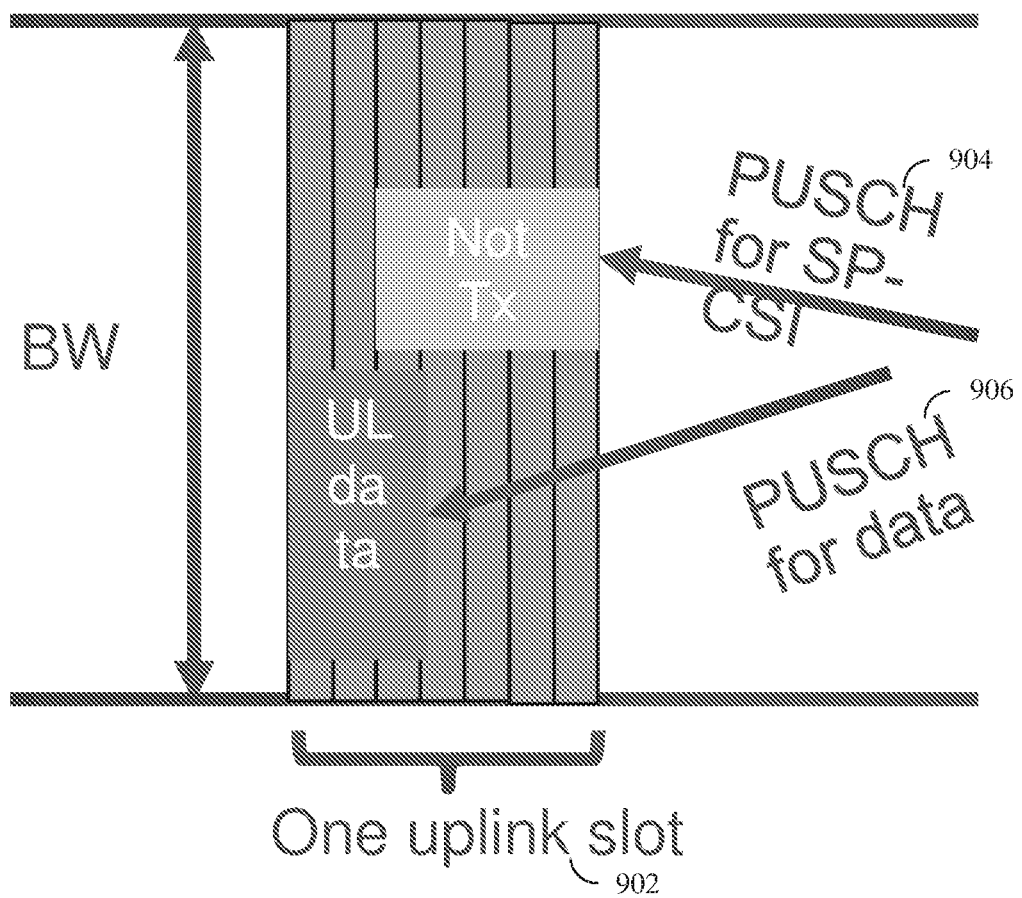
FIG. 9 is an example collision of SP-CSI and uplink data in overlapping symbols in a slot, in accordance with certain aspects of the present disclosure.

FIG. 9 is an example collision of SP-CSI and uplink data in overlapping symbols in a slot, in accordance with certain aspects of the present disclosure. According to certain aspects, the UE determines to drop the SP-CSI 904 if the uplink data 906 and SP-CSI 904 are scheduled in overlapping symbols in the same uplink slot 902 and the uplink data 906 is transmitted (e.g., the UE has uplink data to transmit). For example, the UE determines (e.g., at 704) to drop the at least one CSI transmission if the CSI transmission and data are scheduled in a same symbol in the slot and to transmit the at least one CSI transmission if the CSI transmission and data are scheduled in a different symbol in the slot.

Figure 10:
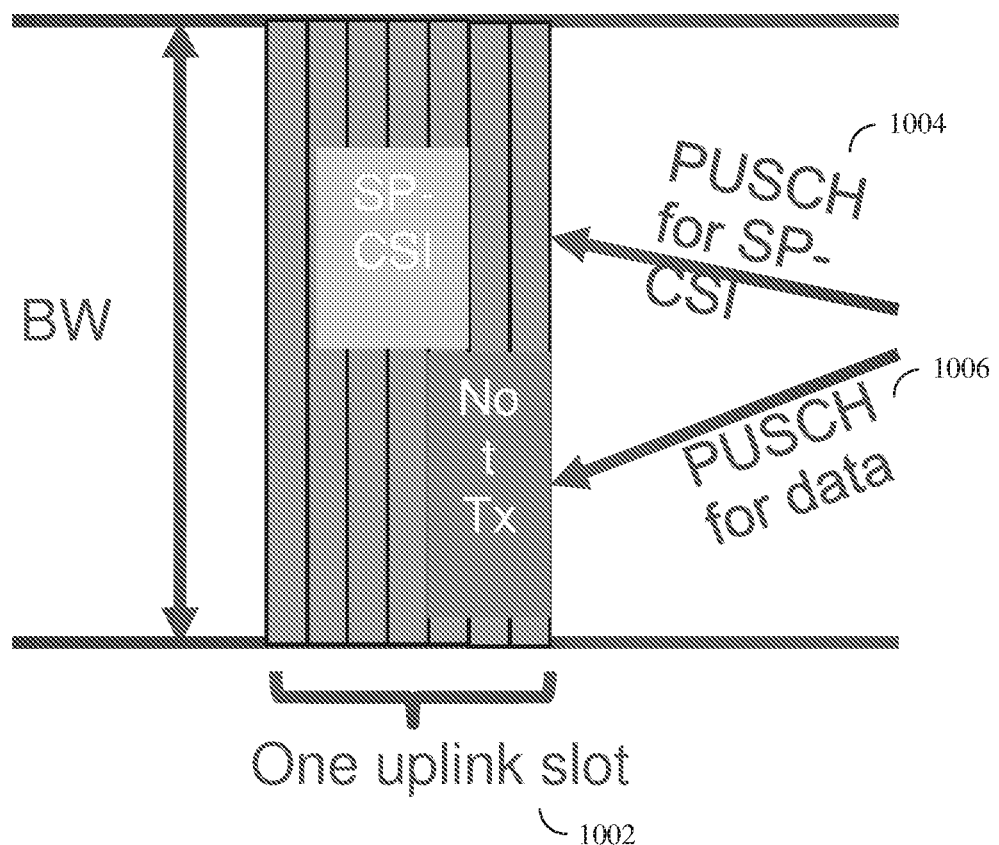
FIG. 10 is an example of SP-CSI transmitted before uplink data in a slot, in accordance with certain aspects of the present disclosure.

FIG. 10 is an example of SP-CSI transmitted before uplink data in a slot, in accordance with certain aspects of the present disclosure. According to certain aspects, the UE determines to transmit (e.g., not to dropped, allowed to be scheduled) the uplink data 1006 is dropped (or not scheduled) if the SP-CSI 1004 is transmitted before the preparation of the uplink data 1006 for transmission in the slot 1002. For example, the UE determines (e.g., at 704) to drop the at least one data transmission if the CSI transmission is scheduled to be transmitted before the data in the same slot.

Figure 11:
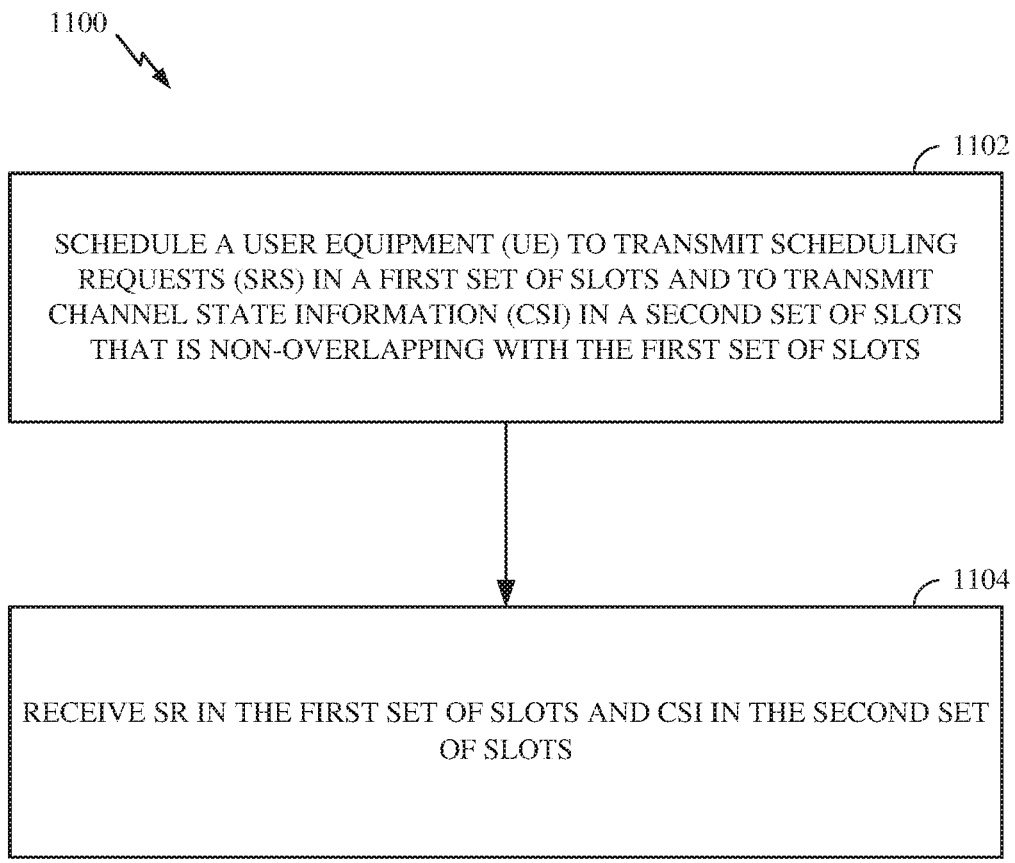
FIG. 11 is a flow diagram illustrating example operations for wireless communications by a BS, in accordance with certain aspects of the present disclosure.

FIG. 11 is a flow diagram illustrating example operations 1100 for wireless communications, in accordance with certain aspects of the present disclosure. The operations 1100 may be performed by a BS (e.g., such as a BS 110 in the wireless communication network 100) for collision handling of CSI in PUSCH. Operations 1100 may be implemented as software components that are executed and run on one or more processors (e.g., processor 440 of FIG. 4). Further, the transmission and reception of signals by the BS in operations 1100 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

The operations 1100 begin, at 1102, by scheduling a UE to transmit SRs in a first set of slots and to transmit CSI in a second set of slots that is non-overlapping with the first set of slots.

At 1104, the BS receives SRs in the first set of slots and SP-CSI in the second set of slots.

According to certain aspects, the BS scheduled/configures the UE such that SRs and CSI reporting do not collide. For example, the BS schedules (e.g., signals and/or configures) the UE (e.g., at 1102) to transmit SRs at a first slot offset n and a first periodicity P1 and signals the UE (e.g., via a DCI) in a slot m to trigger CSI (e.g., SP-CSI) transmission at a second periodicity P2.

In some examples, the BS determines the slot m to trigger SP-CSI transmission and the second periodicity P2 based on the first slot offset n, the first periodicity P1, and a feedback latency Y associated with the SP-CSI. Thus, for the integers j,k greater than or equal to zero, the BS does not schedule $n+j*P1=m+Y+k*P2$, such that the first set of slots for the SR and the second set of slots for SP-CSI do not collide.

According to certain aspects, A-CSI is not allowed to be fed back on the same TTI (e.g., slot) with SR. For example, the BS configures the UE not to transmit, or does not schedule the UE for, A-CSI in a same slot as a SR.

Aspects of the present disclosure may reduce collisions between CSI and other uplink transmissions in the same slot. The reduced collisions may improve communications in a network, such as the wireless communication network 100. For example, the reduced collisions may improve the communications between a UE 120 and a BS 110. The reduced collisions may result in improved reception by the BS 110 of the transmissions from the UE, for example, with less interference, improve SNR, and reduction of failed or missed transmissions from the UE. The improved reception at the BS 110 may result better functioning of the processing at the BS 110, for example, with improved efficiency and reduced power consumption. In turn, the functioning of the UE 120 may be improved.

Figure 12:
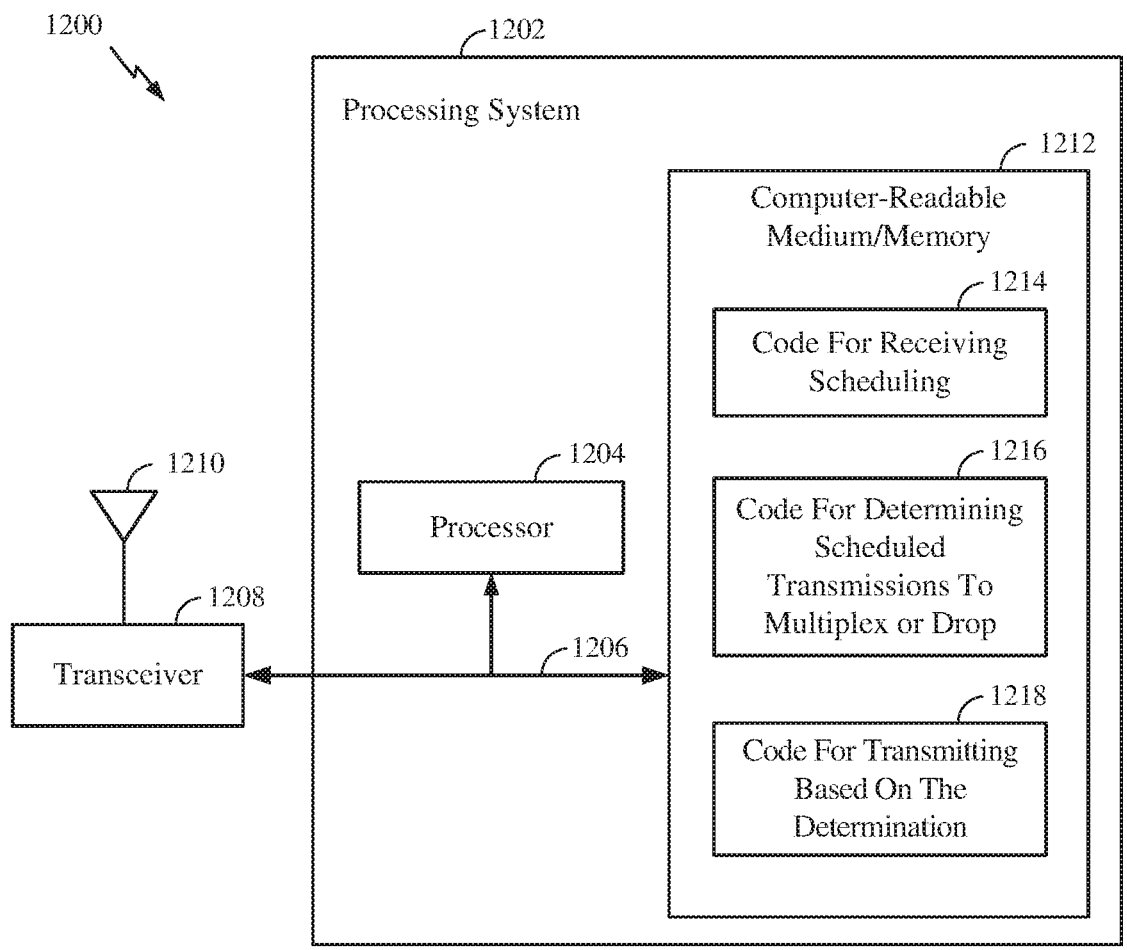
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signals, including, for example, CSI, SR, HARQ feedback, and/or data as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer executable code) that when executed by the processor 1204, cause the processor 1204 to perform the operations illustrated in FIG. 7, or other operations for performing the various techniques discussed herein collision handling for CSI on PUSCH. In certain aspects, computer-readable medium/memory 1212 stores code 1214 for receiving scheduling, for example code for receiving scheduling for at least one CSI reporting transmission and at least one uplink transmission in a same slot in accordance with aspects of the present disclosure; code 1216 for determining scheduled transmissions to multiplex or drop, such as code for multiplex the at least one CSI reporting transmission and the at least one uplink transmission in the slot or to drop the at least one CSI reporting transmission or the at least one uplink transmission in the slot in accordance with aspects of the present disclosure; and code 1218 for transmitting based on the determination, such as code for transmitting in the slot at least one of: the at least one CSI reporting transmission or the at least one uplink transmission based on the determination in accordance with aspects of the present disclosure. The processor 1204 has circuitry 1220 for receiving scheduling; circuitry 2222 for determining scheduled transmissions to multiplex or drop; and circuitry 1224 for transmitting based on the determination.

Figure 13:
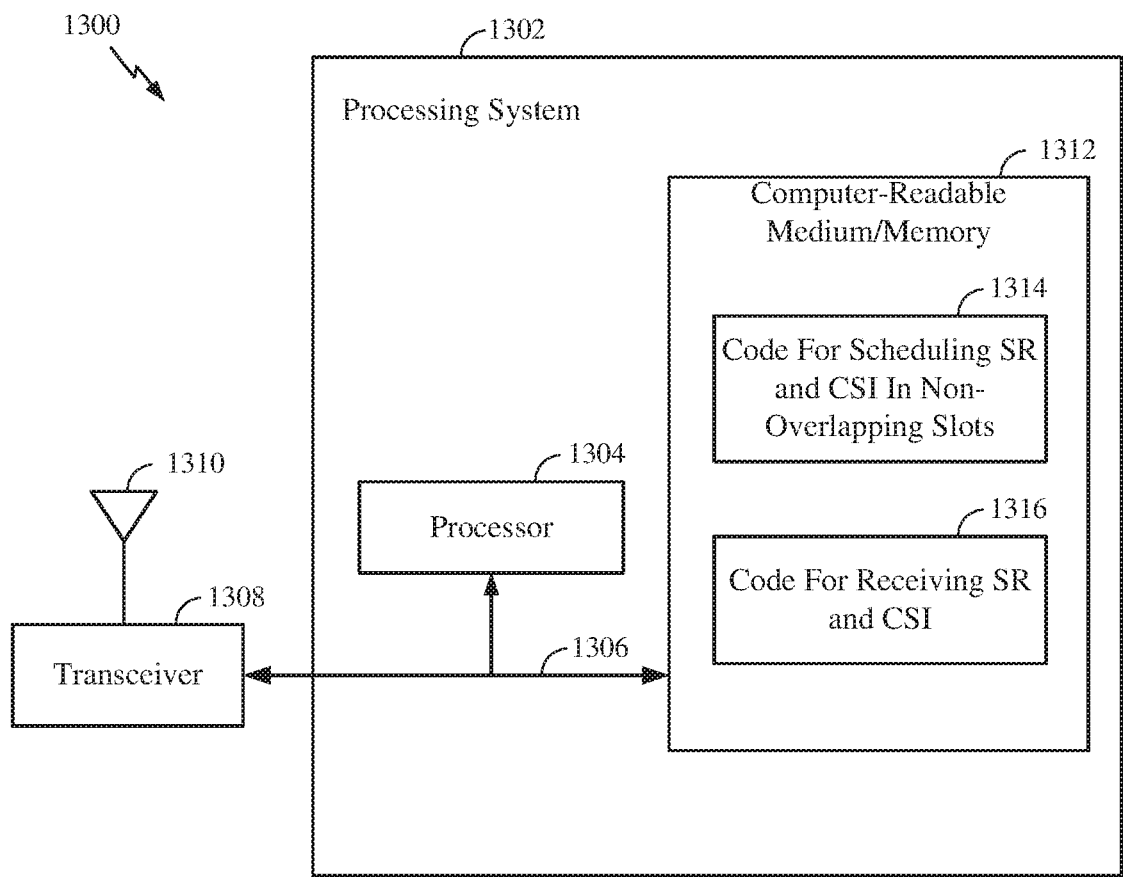
FIG. 13 illustrates another communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308. The transceiver 1308 is configured to transmit and receive signals for the communications device 1300 via an antenna 1310, such as the various signals, including, for example, CSI, SR, HARQ feedback, and/or data as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer executable code) that when executed by the processor 1304, cause the processor 1304 to perform the operations illustrated in FIG. 11, or other operations for performing the various techniques discussed herein collision handling for CSI on PUSCH. In certain aspects, computer-readable medium/memory 1312 stores code 1314 for scheduling SR and CSI in non-overlapping slots and code 1316 for receiving SR and CSI. The processor 1304 has circuitry 1318 for scheduling SR and CSI in non-overlapping slots and circuitry 1320 for receiving SR and CSI.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers. DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM. ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining at least one channel state information (CSI) reporting transmission comprising at least one a semi-persistent CSI (SP-CSI) reporting transmission and at least one uplink transmission are scheduled in a same slot; and
   multiplexing the at least one CSI reporting transmission and the at least one uplink transmission in the slot or dropping the at least one CSI reporting transmission or the at least one uplink transmission in the slot.

2. The method of claim 1, wherein the multiplexing comprises time-domain and frequency-domain multiplexing.

3. The method of claim 1, wherein:
   the at least one CSI reporting transmission further comprises at least one of an aperiodic CSI (A-CSI) reporting transmission; and
   the at least one uplink transmission comprises at least one of: a scheduling request (SR), a hybrid automatic repeat request (HARQ) feedback, or a data transmission.

4. The method of claim 3, wherein at least one of:
the SP-CSI reporting transmission, the A-CSI reporting transmission, or the data transmission is scheduled for transmission in a physical uplink shared channel (PUSCH); and
the SR or HARQ feedback is scheduled for transmission in a physical uplink control channel (PUCCH).

5. The method of claim 4, wherein the multiplexing or dropping comprises multiplexing the at least one CSI reporting transmission and the HARQ feedback in the PUSCH.

6. The method of claim 5, further comprising dropping the PUCCH.

7. The method of claim 5, wherein the multiplexing or dropping comprises dropping the SR.

8. The method of claim 5, further comprising determining a priority associated with the at least one CSI reporting transmission, the SR, and the HARQ feedback, wherein the priority comprises, in ascending order of priority, the at least one CSI reporting transmission, the SR, and the HARQ feedback.

9. The method of claim 5, further comprising:
transmitting the at least one CSI reporting transmission in the PUSCH; and
transmitting the HARQ feedback in the PUSCH.

10. The method of claim 4, wherein the multiplexing or dropping comprises dropping the at least one CSI reporting transmission.

11. The method of claim 10, further comprising multiplexing the HARQ feedback in the PUSCH.

12. The method of claim 10, wherein the multiplexing or dropping comprises dropping the at least one CSI reporting transmission when the SR is a positive SR.

13. An apparatus for wireless communications, comprising:
means for determining at least one channel state information (CSI) reporting transmission comprising at least one a semi-persistent CSI (SP-CSI) reporting transmission and at least one uplink transmission are scheduled in a same slot; and
means for multiplexing the at least one CSI reporting transmission and the at least one uplink transmission in the slot or dropping the at least one CSI reporting transmission or the at least one uplink transmission in the slot.

14. The apparatus of claim 13, wherein the multiplexing comprises time-domain and frequency-domain multiplexing.

15. The apparatus of claim 13, wherein:
the at least one CSI reporting transmission further comprises at least one of an aperiodic CSI (A-CSI) reporting transmission; and
the at least one uplink transmission comprises at least one of: a scheduling request (SR), a hybrid automatic repeat request (HARQ) feedback, or a data transmission.

16. The apparatus of claim 15, wherein at least one of:
the SP-CSI reporting transmission, the A-CSI reporting transmission, or the data transmission is scheduled for transmission in a physical uplink shared channel (PUSCH); and
the SR or HARQ feedback is scheduled for transmission in a physical uplink control channel (PUCCH).

17. The apparatus of claim 16, wherein the means for multiplexing or dropping comprises means for multiplexing the at least one CSI reporting transmission and the HARQ feedback in the PUSCH.

18. The apparatus of claim 17, further comprising means for dropping the PUCCH.

19. The apparatus of claim 17, wherein the means for multiplexing or dropping comprises means for dropping the SR.

20. The apparatus of claim 17, further comprising means for determining a priority associated with the at least one CSI reporting transmission, the SR, and the HARQ feedback, wherein the priority comprises, in ascending order of priority, the at least one CSI reporting transmission, the SR, and the HARQ feedback.

21. The apparatus of claim 17, further comprising:
means for transmitting the at least one CSI reporting transmission in the PUSCH; and
means for transmitting the HARQ feedback in the PUSCH.

22. The apparatus of claim 16, wherein the means for multiplexing or dropping comprises means for dropping the at least one CSI reporting transmission.

23. The apparatus of claim 22, further comprising means for multiplexing the HARQ feedback in the PUSCH.

24. The apparatus of claim 22, wherein the means for dropping comprises means for dropping the at least one CSI reporting transmission when the SR is a positive SR.

25. An apparatus for wireless communications, comprising:
at least one processor coupled with a memory and configured to:
determine at least one channel state information (CSI) reporting transmission comprising at least one a semi-persistent CSI (SP-CSI) reporting transmission and at least one uplink transmission are scheduled in a same slot; and
multiplex the at least one CSI reporting transmission and the at least one uplink transmission in the slot or dropping the at least one CSI reporting transmission or the at least one uplink transmission in the slot.

26. The apparatus of claim 25, wherein:
the at least one CSI reporting transmission further comprises at least one of an aperiodic CSI (A-CSI) reporting transmission; and
the at least one uplink transmission comprises at least one of: a scheduling request (SR), a hybrid automatic repeat request (HARQ) feedback, or a data transmission.

27. The apparatus of claim 26, wherein at least one of:
the SP-CSI reporting transmission, the A-CSI reporting transmission, or the data transmission is scheduled for transmission in a physical uplink shared channel (PUSCH); and
the SR or HARQ feedback is scheduled for transmission in a physical uplink control channel (PUCCH).

28. The apparatus of claim 27, wherein the at least one processor is configured multiplex the at least one CSI reporting transmission and the HARQ feedback in the PUSCH.

29. The apparatus of claim 28, wherein the transmitter is further configured to drop the PUCCH.

30. A non-transitory computer readable medium having computer executable code stored there for wireless communications by a user equipment (UE), comprising:
code for determining at least one channel state information (CSI) reporting transmission comprising at least one a semi-persistent CSI (SP-CSI) reporting transmission and at least one uplink transmission are scheduled in a same slot; and
code for multiplexing the at least one CSI reporting transmission and the at least one uplink transmission in the slot or dropping the at least one CSI reporting transmission or the at least one uplink transmission in the slot.

31. The method of claim 4, wherein the multiplexing or dropping comprises multiplexing the at least one CSI reporting transmission and the SR in the PUCCH.

* * * * *